United States Patent [19]
Born

[11] 3,861,806
[45] Jan. 21, 1975

[54] SIGHTING GONIOMETER
[75] Inventor: Gunthard Born, Munich, Germany
[73] Assignee: Messerschmitt-Bolkow-Blohm, Munich, Germany
[22] Filed: Nov. 9, 1972
[21] Appl. No.: 305,003

[52] U.S. Cl............. 356/152, 356/153, 250/220 M
[51] Int. Cl. ......................................... G01b 11/26
[58] Field of Search......... 356/152, 153; 250/220 M

[56] References Cited
UNITED STATES PATENTS
3,244,889  4/1966  Preston et al...................... 250/211
3,634,689  1/1972  Ejiri et al. ...................... 250/220 M Primary Examiner—Maynard R. Wilbur
Assistant Examiner—S. C. Buczinski
Attorney, Agent, or Firm—Woodhams, Blanchard and Flynn

[57] ABSTRACT

A sighting goniometer which utilizes purely electro-optical means for determining the displacement of a preselected point in X and Y directions from a point within a sighted object. If the point in question is displaced from the zero axis of said directions, a portion of the light emanating therefrom is reflected by a transparent mirror to form an image on a focal plane where it may be viewed simultaneously with the sighted object while a further portion of the light from said point passes through said mirror onto a light-sensitive target. The displacement on such target of the point of impingement thereon of said light from a zero location is read as a voltage proportional to such displacement and said voltage constitutes the output of the apparatus. Such voltage can then be utilized for any purpose desired including the adjustment of balancing resistances to reduce said output error signal to zero. Thus the zero axis on a position sensitive detector corresponds to the sighted point in the focal plane of the apparatus.

1 Claim, 1 Drawing Figure

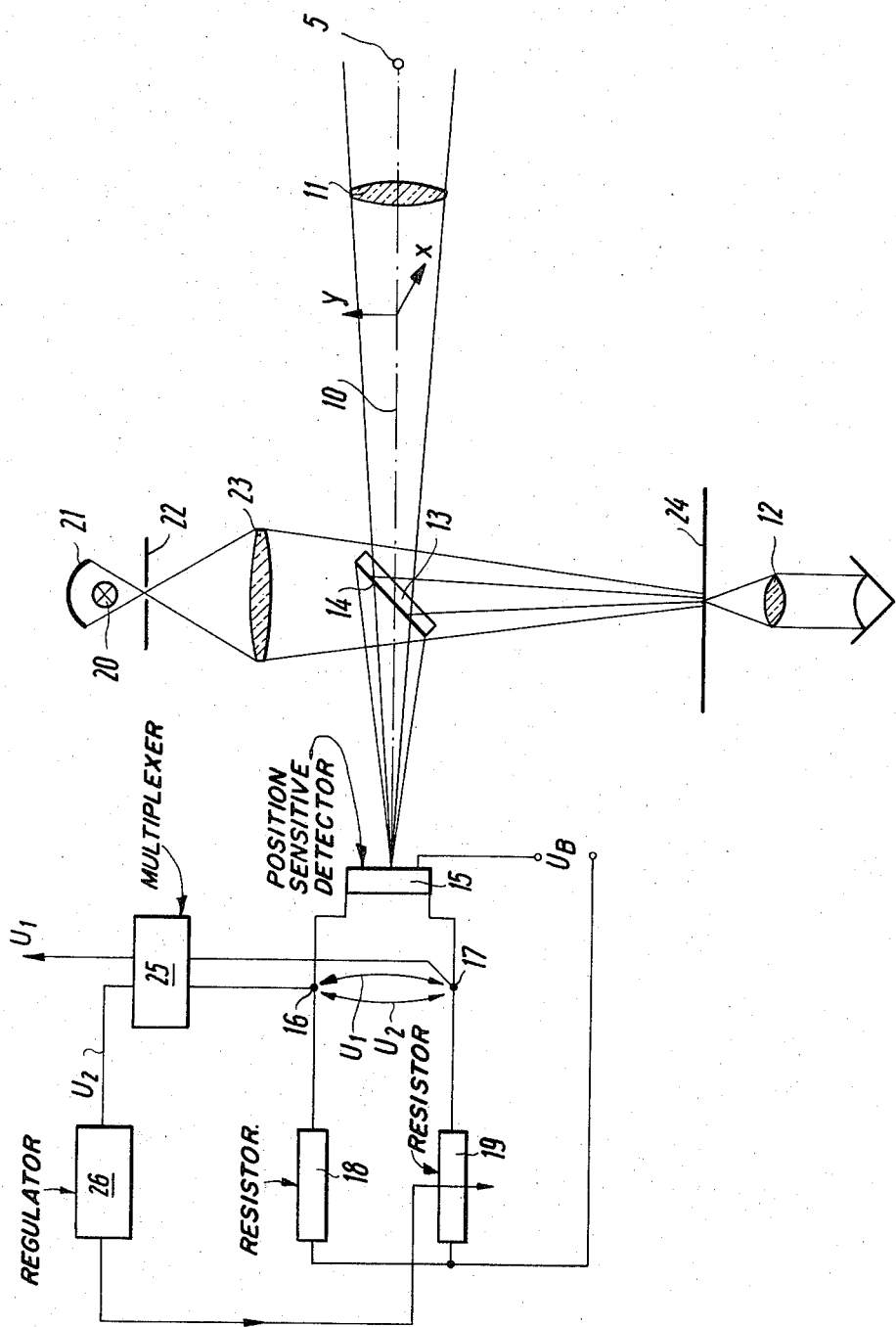

3,861,806

SIGHTING GONIOMETER

The invention refers to a sighting goniometer for measuring the angular location of a luminous point in X and Y direction relative to a sighted object.

Goniometers of the above type are generally known. They preferably function by means of mechanical modulation of the signal originating from the luminous point source. This, however, due to environmental influences of mechanical and thermal nature, precludes the high degree of mechanical stability and precision, required to avoid parallactic errors between the sighting telescope and the measuring device.

It is the objective of this particular invention to design a sighting goniometer, in which the sighting axis is oriented to the axis of the sighting telescope solidly and free of environmental influences. This goal is attained by means of a conventional, partially transparent prism provided with a filter layer and positioned in the sighting axis between a vario-objective and an eyepiece. This prism is coordinated with a position sensitive detector which produces voltage levels proportional to the deviation of the luminous point from the sighting axis in X and/or Y direction, wherein resistors are provided for purposes of exactly defining the respective zero axis position of the X as well as the Y direction. For the formation of the sighting point on the focal plane, a lamp is provided which is modulated both in frequency and in phase. This lamp is equipped with focal mirror perforated screen and an optic. The light signal of this lamp is passed to a regulator by means of a multiplexer for purposes of adjusting the resistor.

By this means it is possible to dispense with mechanically moving parts, and cumbersome adjustments are necessary neither during the manufacture nor during the actual use of the finished instrument. In addition, this achieves an automatic adjustment of the axis. In reliable and simple fashion, the sighting axis of the measuring device is reliably adjusted to the axis of the sighting telescope by means of opto-electronic regulation, and is therefore completely independent of external environmental influences.

This invention is described and illustrated in the following by means of an exemplary embodiment. The single FIGURE of the drawing shows in schematic representation the construction of an exemplary embodiment according to the invention.

The area to be sighted which contains the sighted object and the luminous point (5) is projected onto the focal plane (24) by means of an objective lens (11) and via a partially transparent reflector mirror (13), where it can be viewed by means of an eyepiece (12). In addition a portion of the light passes through the partially transparent reflector mirror (13) so that the area to be sighted is also projected onto a position sensitive detector (15), preferably of the type of the PIN-SC series produced by the company: United Detector Technology, Santa Monica, Calif. In case that the luminous point is characterized by a typical spectrum color - as for example visible or infrared laser light, the partially transparent mirror (13) is equipped with a filter layer (14) which allows the light of the luminous point (5) to pass through, which however completely reflects and filters out all other spectrum areas of the light beam. Consequently, the light point (5) is projected onto detector (15), while the remaining area around the luminous point is visible in the focal plane (24) in front of the eyepiece (12).

The position sensitive detector 15 produces between the terminal points (16) and (17) a voltage $U_{(1)}$, the quantitative level of which is proportional to the displacement of the luminous point in X direction from a zero axis (10), the position of said zero axis being defined by the ratio of the resistors (18) and (19).

The detector (15) is equipped with two additional terminal points, not shown in the FIGURE, which allow for the determination, in the identical manner, and with identical means, as described above, of the position of the luminous point in the Y direction, orthogonally with respect to the X direction.

For the fixing of the sighting point - which is equivalent to the intersection of the zero axis for the X and Y coordinates - there is provided a lamp (20) whose light is first focused onto a perforated screen (22) by means of a mirror (21). Subsequently, the light is concentrated by an optical system represented by the lens (23), while a portion thereof is focused past the prism (13) onto the focal plane (24). Here the light appears as a bright focal point, serving the viewer as the sighting point. The other portion of the light is passed through the prism (13) onto the position sensitive detector (15). Here, this luminous point produces in case of unequal adjustment of the resistors (18, 19) a so-called "error signal" $U_{(2)}$ between the terminal points (16, 17). The lamp (20) can be modulated as to frequency and, if necessary, also as to phase in such a way that the signal $U_{(2)}$ can be separated from the measuring signal $U_{(1)}$ by means of a multiplexer (25). The signal $U_{(2)}$ is then passed to a regulator (26), which respectively causes the subsequent adjustment of the resistor (19) in such a manner as to make $U_{(2)}$ equal zero ($U_{(2)} = 0$). An adjustment in like manner may be provided for the position of the zero coordinate with respect to Y direction.

With this arrangement it is made possible that the zero axis (10) on the position sensitive detector (15) always corresponds to the sighting point in the focal plane (24), and this is achieved quite independent of any mechanically or thermally induced deviations of the optical components relative to each other.

The embodiment of the invention in which an exclusive property or privilege is claimed are defined as follows:

1. A sighting goniometer for measuring the angular position of a luminous point in terms of at least either an X or Y orthogonal direction relative to a sighted object, comprising a partially transparent prism having a filter layer positioned in a sighting axis and located between an objective lens and a focal plane, a position sensitive detector adapted to produce voltage levels in response to light impinging thereon between terminal points, said voltage levels being proportional to the displacement of said luminous point from said sighting axis and in terms of at least either said X or Y orthogonal directions, electrical resistance means having at least one adjustable resistor therein connected in circuit with said position sensitive detector to exactly control the location of the respective zero axis position of either said X or Y orthogonal directions, a modulatable lamp adapted to be modulated by at least either a frequency modulation or a phase modulation and a focusing mirror for producing a light beam, said light beam being transmitted to said position sensitive detector to produce a voltage level $U_{(1)}$ and to a sighting point on said focal plane through means defining a perforated screen and an optical system, said light from said luminous point being also transmitted to said position sensitive detector to produce a voltage level $U_{(2)}$, means defining a multiplexer connected in circuit with said position sensitive detector and adapted to receive both of said voltage levels $U_{(1)}$ and $U_{(2)}$ from said position sensitive detector and to separate said voltage level $U_{(1)}$ from said voltage level $U_{(2)}$, means defining a regulator connected in circuit with said multiplexer means and adapted to receive said voltage level $U_{(2)}$ from said multiplexer means and to control the adjustment of said adjustable resistor in response thereto to cause said voltage level $U_{(2)}$ to equal zero.

* * * * *

UNITED STATES PATENT OFFICE
CERTIFICATE OF CORRECTION

Patent No. 3,861,806　　　　　　　　Dated February 24, 1975

Inventor(s) Gunthard Born

It is certified that error appears in the above-identified patent and that said Letters Patent are hereby corrected as shown below:

Change the Assignee from "Messerschmitt-Bolkow-Blohm" to

---Messerschmitt-Bolkow-Blohm GmbH---.

Please include the following priority information:

---German Serial No. P21 57671.6, filed November 20, 1971---.

Signed and sealed this 29th day of April 1975.

(SEAL)
Attest:

RUTH C. MASON
Attesting Officer

C. MARSHALL DANN
Commissioner of Patents
and Trademarks